(12) United States Patent
Song

(10) Patent No.: US 9,075,138 B2
(45) Date of Patent: Jul. 7, 2015

(54) EFFICIENT PULSE DOPPLER RADAR WITH NO BLIND RANGES, RANGE AMBIGUITIES, BLIND SPEEDS, OR DOPPLER AMBIGUITIES

(75) Inventor: William S. Song, Lexington, MA (US)

(73) Assignee: Massachusetts Institute of Technology, Cambridge, MA (US)

( * ) Notice: Subject to any disclaimer, the term of this patent is extended or adjusted under 35 U.S.C. 154(b) by 506 days.

(21) Appl. No.: 13/453,195

(22) Filed: Apr. 23, 2012

(65) Prior Publication Data

US 2013/0278455 A1   Oct. 24, 2013

(51) Int. Cl.
  *G01S 13/08* (2006.01)
  *G01S 13/22* (2006.01)
  *G01S 13/28* (2006.01)
  *G01S 13/58* (2006.01)

(52) U.S. Cl.
  CPC .............. *G01S 13/22* (2013.01); *G01S 13/288* (2013.01); *G01S 13/582* (2013.01)

(58) Field of Classification Search
  CPC ....... G01S 13/24; G01S 13/20; G01S 13/106; G01S 13/22; G01S 13/222; G01S 13/225
  USPC .................. 342/109, 112, 131, 136, 137, 163
  See application file for complete search history.

(56) References Cited

U.S. PATENT DOCUMENTS

| | | | |
|---|---|---|---|
| 3,480,953 A | 11/1969 | Shreve | |
| 4,328,495 A | 5/1982 | Thue | |
| 5,036,324 A | 7/1991 | Lamper et al. | |
| 6,111,537 A * | 8/2000 | Andersson | 342/137 |
| 6,381,261 B1 * | 4/2002 | Nagazumi | 375/138 |
| 6,639,546 B1 * | 10/2003 | Ott et al. | 342/129 |
| 7,071,868 B2 | 7/2006 | Woodington et al. | |
| 7,081,848 B1 * | 7/2006 | Adams | 342/118 |
| 7,209,521 B2 * | 4/2007 | Szajnowski et al. | 375/259 |
| 7,439,906 B1 * | 10/2008 | Blunt et al. | 342/195 |
| 7,773,028 B2 * | 8/2010 | Chan et al. | 342/137 |
| 2003/0156057 A1 * | 8/2003 | Rohling et al. | 342/109 |
| 2011/0279307 A1 | 11/2011 | Song | |

OTHER PUBLICATIONS

Skolnik, M. "Introduction to Radar Systems" 3rd Edition, Chapter 3, pp. 104-197; McGraw-Hill:1927; Jul. 21, 2009.; reference found on Internet, Apr. 2, 2012.

Stralka, J., et al. "Pulse Doppler Radar" Radar Handbook, Chapter 4, pp. 4.1-4.53, McGraw-Hill:2008; Jun. 21, 2011; reference found on Internet, Apr. 2, 2012.

Long, W., et al. "Pulse Doppler Radar:"; Chapter 17, pp. 17.1-17.41; Westinghouse Electric Corporation; reference found on Internet, Apr. 2, 2012.

Mao, F., "On Almost Perfect Punctured Binary Sequence Pair" IEEE; May 12, 2006.

Xu, L. "A Ternary Pulse Compression Code: Design and Application to Radar System" IEEE, 2010; reference found on Internet, Apr. 2, 2012.

(Continued)

*Primary Examiner* — John B Sotomayor
*Assistant Examiner* — Marcus Windrich
(74) *Attorney, Agent, or Firm* — Cesari and McKenna, LLP

(57) ABSTRACT

A Doppler radar system that avoids blind ranges, range ambiguities, blind speed and/or Doppler ambiguities. Pulse width, repetition interval and pulse type are varied from pulse to pulse within a coherent processing interval.

23 Claims, 6 Drawing Sheets

(56) References Cited

OTHER PUBLICATIONS

Ferrari, A. "Doppler Ambiguity Resolution Using Multiple PRF" IEEE, Sep. 10, 1993 reference found on Internet, Apr. 2, 2012.
Davis, R., et al. "Phase Coded Waveforms for Radar" The MITRE Corporation, pp. 1-19 reference found on Internet, Apr. 2, 2012.
Nunez, A., et al. "Transform Domain Communication System as an Ultra-Wideband Radar" Proceedings fo SPIE, vol. 5788, pp. 147-154; reference found on Internet, Apr. 2, 2012.
Doppler Ambiguity Resolution Using Optimal Multiple Pulse Repetition Frequencies IEEE, Sep. 10, 1977; revised Mar. 1, and Aug. 7, 1998; reference found on Internet, Apr. 2, 2012.

* cited by examiner

EFFICIENT PULSE DOPPLER RADAR WITH NO BLIND RANGES, RANGE AMBIGUITIES, BLIND SPEEDS, OR DOPPLER AMBIGUITIES

BACKGROUND

Certain types of radars that exploit the Doppler effect for target detection are called Doppler radars. The Doppler effect manifests itself when there is a relative range rate, or radial velocity, between the radar and the target. When the radar's transmit signal is reflected from such a target, the carrier frequency of the return signal will be shifted. Assuming a collocated transmitter and receiver, the resulting Doppler frequency shift is a function of the carrier wavelength and the relative radial velocity (range rate) between the radar and the target. When the target is moving away from the radar, the relative radial velocity, or range rate, is defined to be positive and results in a negative Doppler shift.

Doppler radar systems can be either continuous wave (CW) or pulsed. CW radars simply observe the Doppler shift between the carrier frequency of the return signal relative to the transmit signal.

Pulse Doppler radars use a coherent train of pulses where there is a fixed or deterministic phase relationship of the carrier frequency between each successive radio frequency (RF) pulse. Coherence concentrates the energy in the frequency spectrum of the pulse train around distinct spectral lines, separated by the pulse repetition frequency (PRF). This separation into spectral lines allows for discrimination of Doppler shifts.

The pulsed nature of the transmitted signal permit time gating of the receiver, which allows for blanking of direct transmit energy leakage into the receiver. This permits the use of a single antenna for transmit and receive, which otherwise would not be feasible.

Pulse Doppler radars can also use range gating, which divides the inter-pulse period into cells or range gates. The duration of each range gate is typically less than or equal to the inverse of the transmit pulse bandwidth. Range gating can help eliminate excess receiver noise from interfering with target return pulses, and allow range measurement with pulse delay ranging (i.e., measuring the time between transmission of a pulse and reception of the target echo).

SUMMARY

Existing pulse Doppler radars can have certain shortcomings such as blind ranges, range ambiguities, blind speeds, and/or Doppler ambiguities. Provided here is a way to implement a pulse Doppler radar system with specific arrangement of transmit pulses and receive pulse processing to avoid these shortcomings.

According to the teachings herein, a pulse Doppler radar can resolve target range and speed in a single coherent processing interval for all ranges and speeds. This results in higher power efficiency and timeline efficiency, since the target range and speed can be resolved within a single coherent processing interval. Other pulse Doppler radars typically require multiple coherent processing intervals to resolve blind ranges, blind ambiguities, blind speeds or Doppler ambiguities. In these other systems, the use of multiple coherent processing intervals wastes transmitted radar power as well as time. Radars implemented according to the teachings herein instead achieve high duty cycle, reduce the peak power required, and potentially reduce the cost of the transmitter. Furthermore, a radar constructed according to the teachings herein is inherently more difficult to jam.

In one embodiment, a pulse Doppler radar varies a transmit pulse waveform, pulse width, and/or pulse repetition interval (PRI) from pulse to pulse within a single coherent processing interval (CPI) in such a way as to provide all range gates with equal fraction of pulse return energy.

The transmit waveform can be varied using (i) a signal with random properties, such as a random signal, (ii) a pseudorandom (PN), Gold code, or other code having low cross-correlation with itself and/or (iii) modulation such as bi-phase, quadrature, or other modulation schemes. What is important is that, within a given CPI, there is minimal correlation between one section of a pulse and another section of that same pulse, as well as minimal correlation between one section of a pulse and sections of other pulses.

The radar timeline can be discrete, and divided into multiple time bins, preferably each of equal width, and the radar can either operate in transmit or receive mode in each time bin. Multiple adjacent bins are selected for transmit or receive in such a way that the radar achieves a uniform transmit duty cycle, D, when a substantial number time bins within a CPI is observed. The bins can be individually assigned to either a transmit or receive mode using probabilistic random sequences, probabilistic pseudorandom sequences, deterministic sequences, or any other sequences that satisfy the above condition.

In other specific embodiments it is desirable to avoid repeating the same sequence within a CPI, except that such repetition can be permissible if the repetition duration is longer than a specified time that depends on the maximum detectable range of the radar.

In other embodiments, the radar time line can be continuous. In such an implementation, the same variation in pulse width, pulse duration and/or PRI within a CPI provide constant duty cycle, D, over a significant portion of a CPI.

BRIEF DESCRIPTION OF THE DRAWINGS

The foregoing will be apparent from the following more particular description of example embodiments, as illustrated in the accompanying drawings in which like reference characters refer to the same parts throughout the different views. The drawings are not necessarily to scale, emphasis instead being placed upon illustrating example embodiments.

DETAILED DESCRIPTION OF THE EMBODIMENTS

A description of example embodiments follows.

Figure 1:
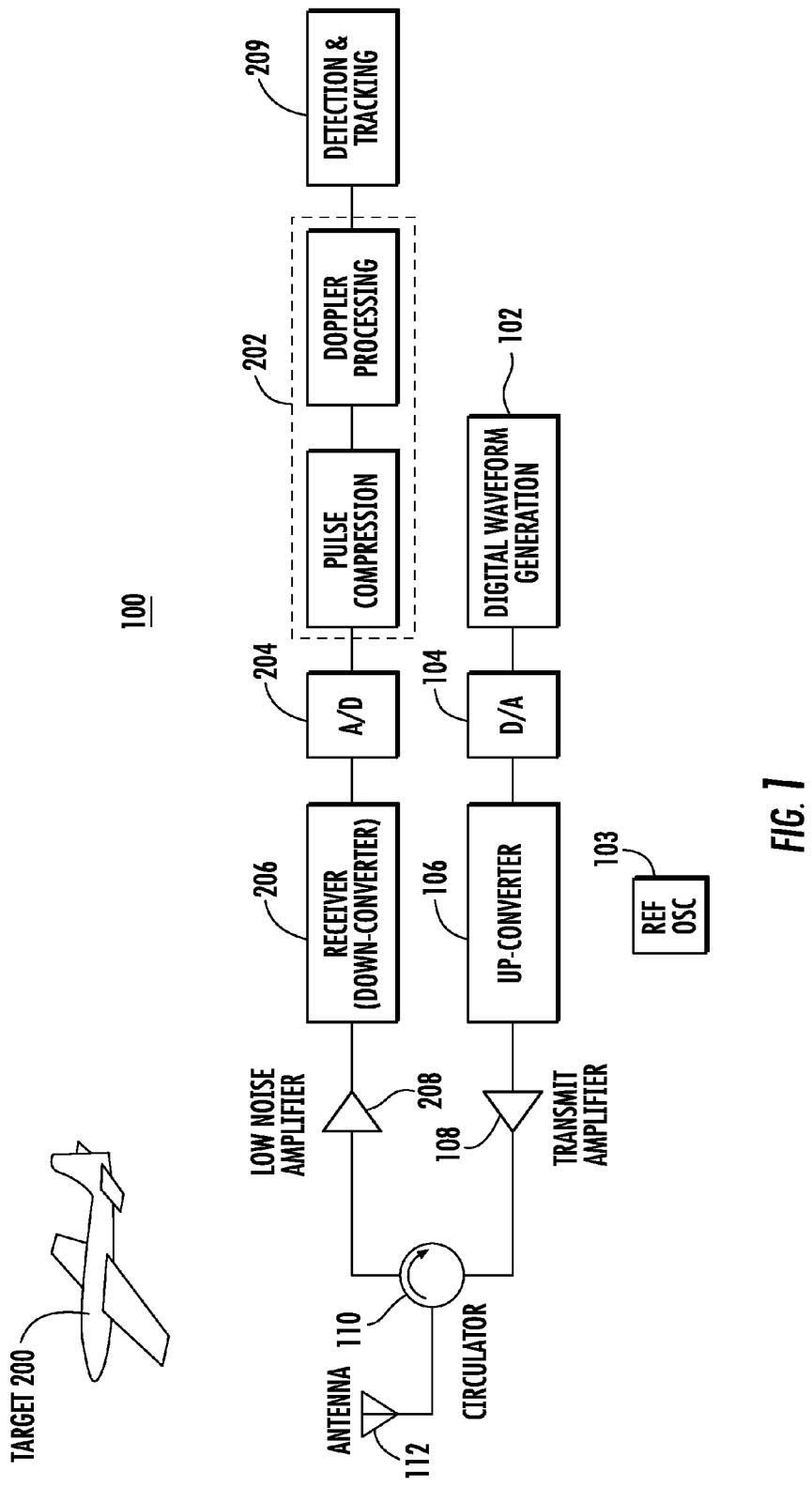
FIG. 1 is a general high-level diagram of a pulse Doppler radar system that may generate transmit pulses and process return receive pulses according to the teachings herein.

FIG. 1 is a high level diagram of a pulse Doppler radar system 100 that has no blind ranges, no range ambiguities, no blind speeds and no Doppler ambiguities. These features are accomplished by the specific transmit pulses generated by digital waveform generation block 102 and with optional further details in the pulse Doppler processing block 202. However, before discussing these features in detail it would be helpful to review the primary components of the radar system 100.

Digital waveform generator 102 generates pulses which are then digitized by digital to analog (D/A) converter 104 and up converted to a radio frequency carrier by up converter 106. A transmit amplifier 108 generates a transmit signal, which is fed to a circulator 110 that is coupled to an antenna 112.

On the receive side a low noise amplifier 208 receives pulses reflected from a target 200 (such as an aircraft) which are received by antenna 112. The amplified receive signal is then fed to a down converter 206. The down converted pulses are then fed to an analog to digital (A to D) converter 204 before being processed by the pulse compression/Doppler processing block 202. A final block 209 performs pulse detection and tracking. Pulse compression (if implemented in block 202) provides higher signal to noise ratio (SNR) as well as compression in range. The Doppler functions performed in block 202 provide target velocity information.

Reference oscillator 103 is used to derive local oscillator and clock signals for various components of the system such as D/A 104, up converter 106, down converter 206, A/D 204, and possibly other components.

The up converter 106 consists of intermediate frequency (IF) and or radio frequency (RF) oscillators, filters and synchronizing circuits; corresponding IF/RF oscillators and filters are provided on the receiver side via converter 206. The low noise receiver amplifier 208 may have one or more amplifier stages and may include automatic gain control (AGC) and other functions typical of radar systems.

Detection and tracking 209 depends upon the type of radar. For example, the radar may be a single channel, phased array, beam steering radar or other type of radars. What is important here is to appreciate that the specific attributes of the pulsed waveform described herein are applicable to many different types of radar systems.

More specifically, the digital waveform generator 102 generates pulses that have different pulse width, different waveform type, and different pulse repetition interval (PRI) for at least two or more pulses within a given coherent processing interval (CPI). In one embodiment, all of the pulses within a given CPI vary these parameters over the duration of the CPI. The CPI interval is defined by a set of adjacent pulses that form a pulse train that have a deterministic phase relationship with respect to a reference carrier frequency. The reference oscillator 103 may therefore further be used to derive digital waveform generation to ensure coherence within CPI.

Figure 2:
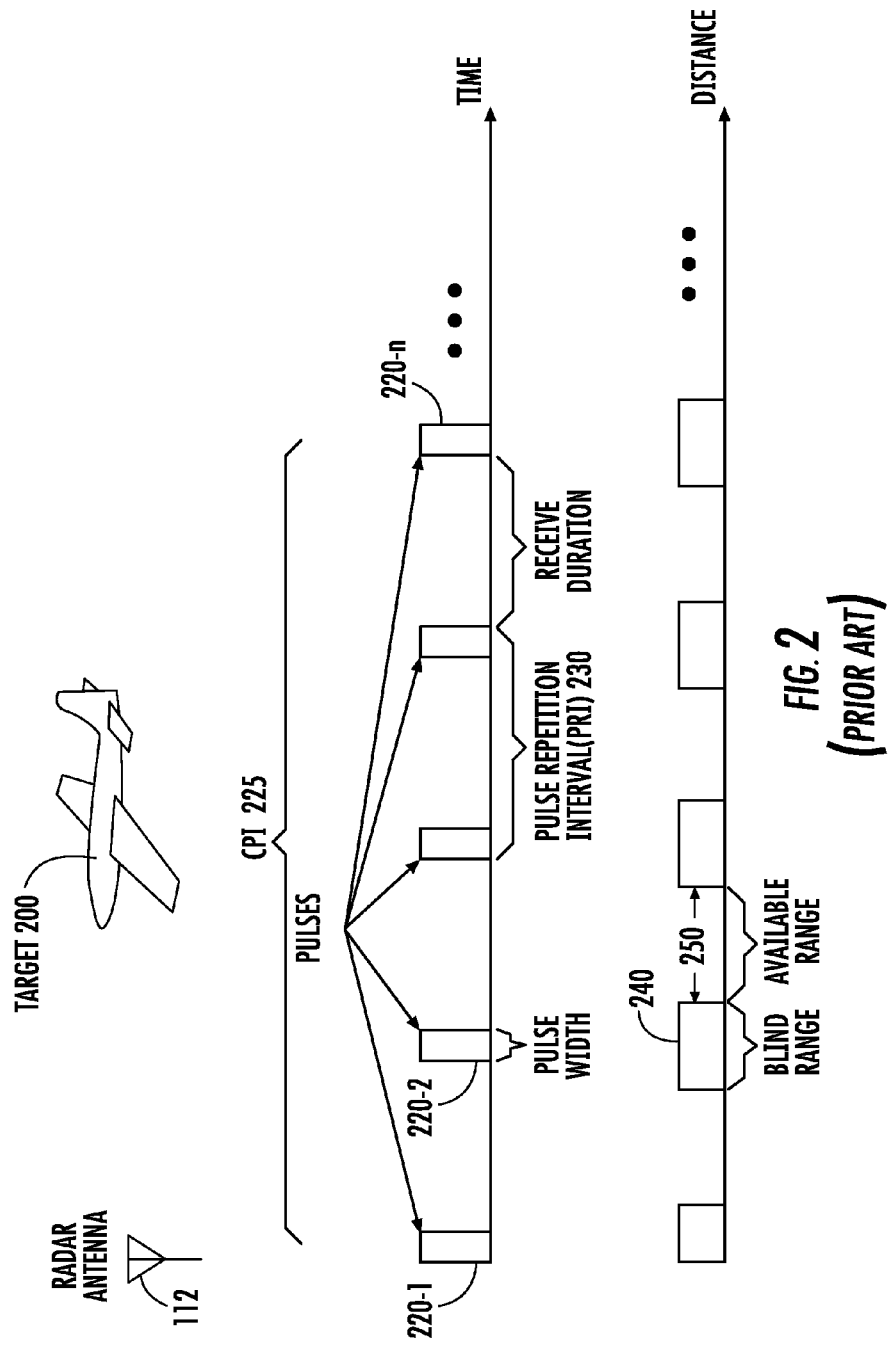
FIG. 2 illustrates a conventional pulse train known in the prior art.

The preferred pulse train is quite different from the conventional pulse train. To appreciate the difference, consider the top trace of FIG. 2, which is a time line of a prior art conventional pulse train generated for an example CPI 225. In this conventional arrangement of the prior art, the pulse train consists of a sequence of pulses 220-1, 220-2 . . . 220-n that are coherently generated with the CPI 225. However, the width of each pulse 220 is the same as its adjacent pulse within the CPI 225. Furthermore, the pulse repetition interval PRI 230, or the time interval between consecutive pulses, also remains the same within a CPI 225. The waveform used to generate each pulse is also the same, within the CPI in this simple example of the prior art. The bottom trace in FIG. 2 is one of distance and shows the effect of such a system. As is well known, a blind range 240 results because of the round trip travel time for the pulse to return from the target. In the example shown, the available range 250 is limited by this blind range 240.

Pulse Doppler or moving target indication (MTI) as known in the prior art cannot typically transmit and receive at the same time because the high power transmit pulses tend to saturate the receiver. Therefore, the receiver is blanked during transmit intervals, and the radar may only receive signals when it is not transmitting. Such pulse Doppler radars of the prior art thus generally have blind ranges, range ambiguities, blind speeds and Doppler ambiguities. For a relatively high PRI radar system such receive banking results in blind ranges 240 as shown in FIG. 2. The width of the blind range is actually larger than the pulse duration, $cw_p/2$, where $w_p$ is the pulse width and c is the speed of light. The width of the blind range 240 in which the pulse compressed signal is compromised in SNR is equal to $3\ cw_p/2$ because the range gates do not receive the full pulse compression in SNR gain. One can lower the pulse repetition frequency (PRF) to reduce blind ranges, but a lower PRF also increases blind speeds or Doppler ambiguities.

Figure 3:
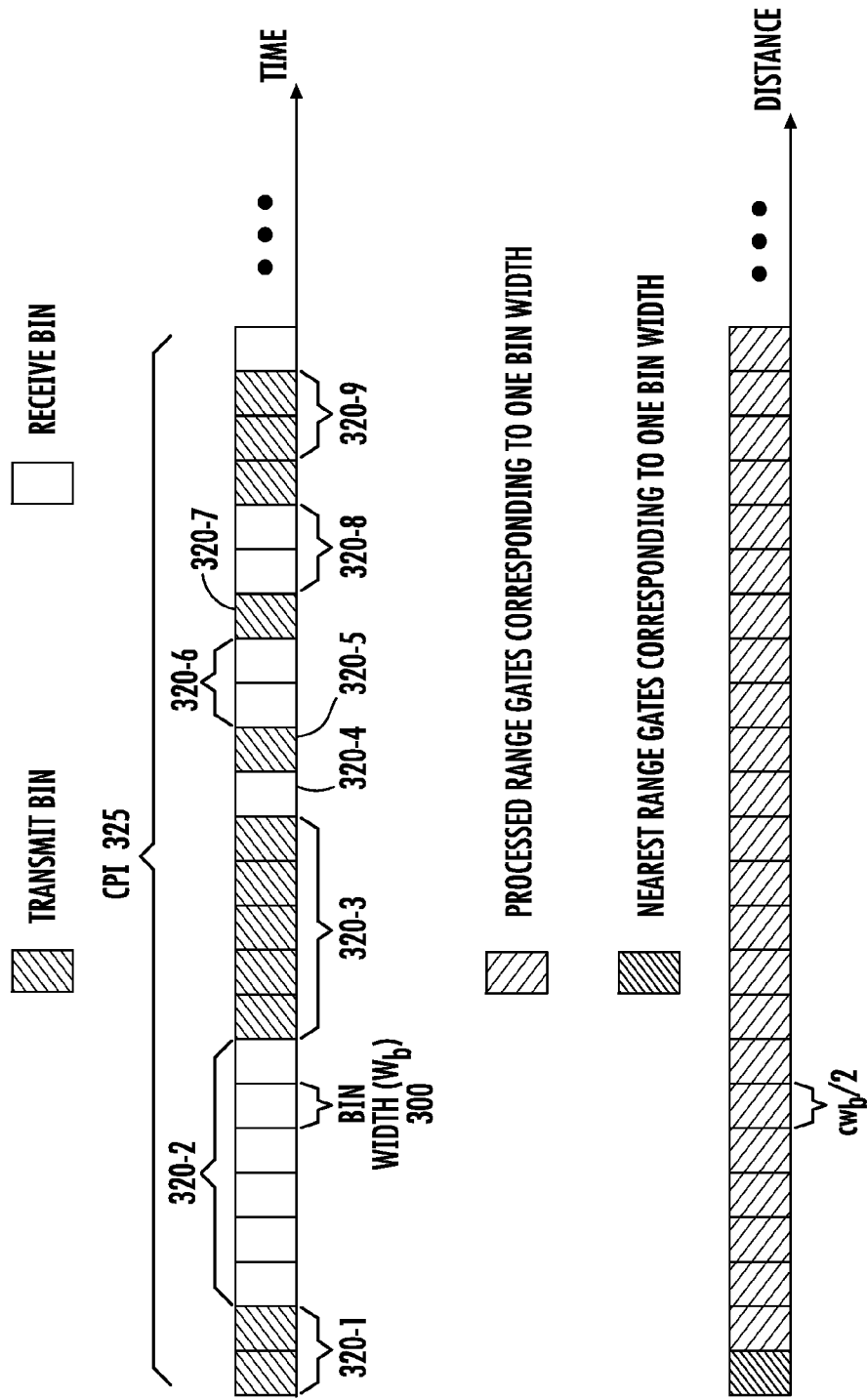
FIG. 3 illustrates a preferred implementation showing the assignment of transmit and receive times in a system that uses a discrete radar time line.

FIG. 3 shows, in distinct contrast, how pulses are generated in the present implementation. In the non-limiting example, the radar time line is divided into bins 300 of equal width duration. In each time bin, the radar can operate in either a transmit or receive mode. The bin time width $W_b$ is equal to a minimum pulse width and therefore is also equal to a minimum receive duration. Transmit bins are shown with light shading and the receive bins are shown un-shaded.

A given transmit pulse is assigned a duration of one or more bins. Unlike the conventional radar illustrated in FIG. 2, a given transmit pulse may therefore have a different duration from its next successive transmit pulse; the PRI also varies within a CPI 325. In this example, the first transmit pulse 320-1 has a time duration of two bins, and subsequent transmit pulse 320-3 is five bins in duration. Pulse 320-5 is a single bin as well as pulse 320-7, but pulse 320-9 has a duration of three bins.

Similarly, receive time is varied within a CPI 325. So for example, the first receive slot 320-2 is a duration of six bins, the second receive slot 320-4 is one bin, the third 320-6 is two bins, and the fourth 320-8 is two bins in duration.

With the implementation of FIG. 3, transmitted pulses are therefore generated such that they vary in pulse waveforms, pulse width, and PRI from pulse to pulse within a given CPI 325 in such a way as to provide all target ranges with approximately equal fraction of pulse return energy.

Assignment of bins for transmit or receive is decided in such a way that the system 100 achieves fairly uniform transmit duty cycle when a set of consecutive time bins within a CPI 325 is observed. The bins are preferably assigned to transmit or receive using a probabilistic random sequence, probabilistic pseudo-random sequences, deterministic sequences or any other sequence that will satisfy this condition. Overall, each time bin has probability D of being a transmit bin and (1-D) of being a receive bin.

It is also preferable to avoid repeating portions of a transmit/receive bin assignment sequence within a given CPI 325, except that such repetition can be allowed if the repetition duration is longer than $2\ d_{max}/c$ where $d_{max}$ is the maximum detectable range of the radar.

The transmit waveform type is also varied within a CPI by varying its coding and/or modulation. In other words, a different code and/or different modulation is applied to a given transmit pulse 320-1 than a next successive transmit pulse 320-3.

The waveform used may be a waveform with random properties (such as a random signal) or it can be a coded waveform using a pseudorandom noise (PN) code, Gold code, or other code having low cross-correlation, or it can be modulated with a bi-phase, quadrature, or other modulation schemes. A given transmit pulse, if coded, may further include multiple PN code "chips".

Modulation, if used, may be bi-phase, quadrature or encompass many other modulation schemes. Pulse repetition interval (PRI) is varied simply because of the artifact of making the duration of the transmit pulses and receive bins different. What is important is that there should be minimal significant correlation between one section of a pulse (containing bins and chips) with another section of that same pulse within a given CPI. In addition, it is preferable that there be minimal correlation between one section of a pulse and sections of other pulses within a CPI. That way, the pulse compression result from one target should result in a detectable peak output from the pulse compressor/Doppler processing 202 in the receiver. Other pulse compression sidelobes should remain low, as described below.

The bottom trace of FIG. 3 shows range information for such a radar. Each group of "range gates" corresponding to each transmit/receive time bin has a width $cw_b/2$. The return signal from a target has a probability of 1-D of being received and processed, and a probability D of not being processed (blanked). In other words, each time instant of the pulse return energy from the target has a probability (1-D) as being included in the radar processing to detect the target. Over time, the reflected pulses from the given range gate are therefore received approximately (1-D) fraction of the time (where D is expressed in a fraction or decimal and not a percent). Therefore, the radar statistically achieves a constant average transmit duty cycle D as well as received duty cycle (1-D). The overall SNR of the return signal after pulse compression or constant peak transmit power is proportional to D(1-D), since the radar has transmit pulse duty cycle D and receive duty cycle (1-D). An exception would be found in the nearest group of range gates corresponding to the nearest bin, since the receiver is always blanked while transmitting any pulses, even for a minimum pulse width (e.g. of a single transmit bin). This effect is further described in greater detail below.

Figure 4:
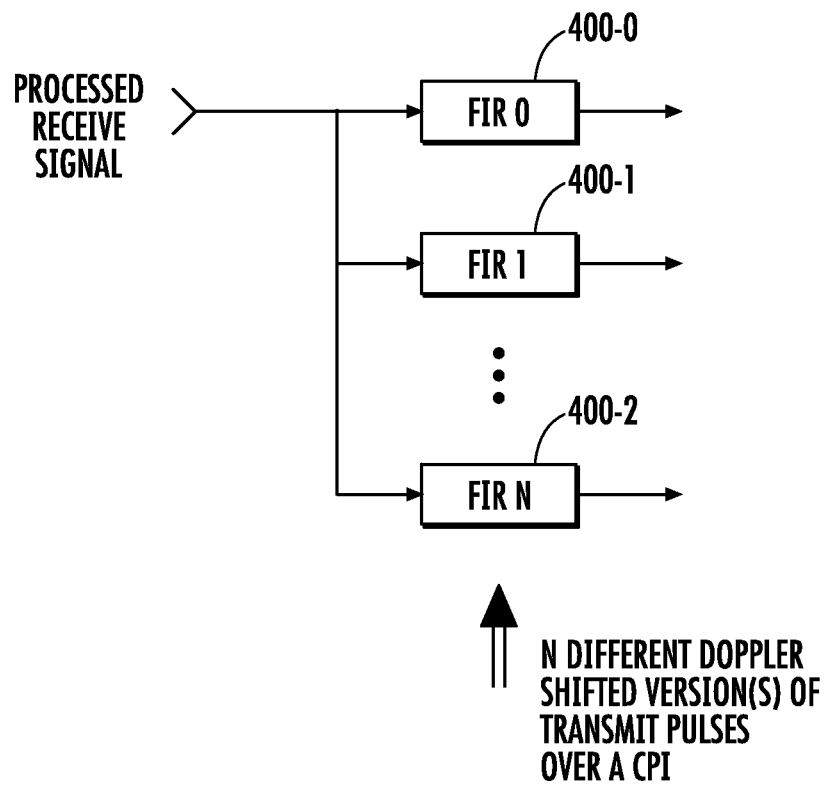
FIG. 4 is a general diagram of Doppler processing of the receive signal.

FIG. 4 is a high level diagram showing an example Doppler processing block 202. Here, the receive signal is fed to a number of finite impulse response (FIR) processors; it will be understood that there are other mathematically equivalent techniques that achieve the same goal (such as Fast Fourier Transform (FFT) based processing. Each FIR processor 400 carries out Doppler processing, with a different Doppler shifted version of the transmitted wave form within each pulse and for each CPI. For example, FIR 0 400-0 is fed the transmit pulses with no Doppler shift, and generates the output for "no speed" targets. Doppler bins with different Doppler shifts are processed by different Doppler filters 400-1, . . . , 400-n each having a version of Doppler shifted transmit pulses in the given CPI 325.

Figure 5:
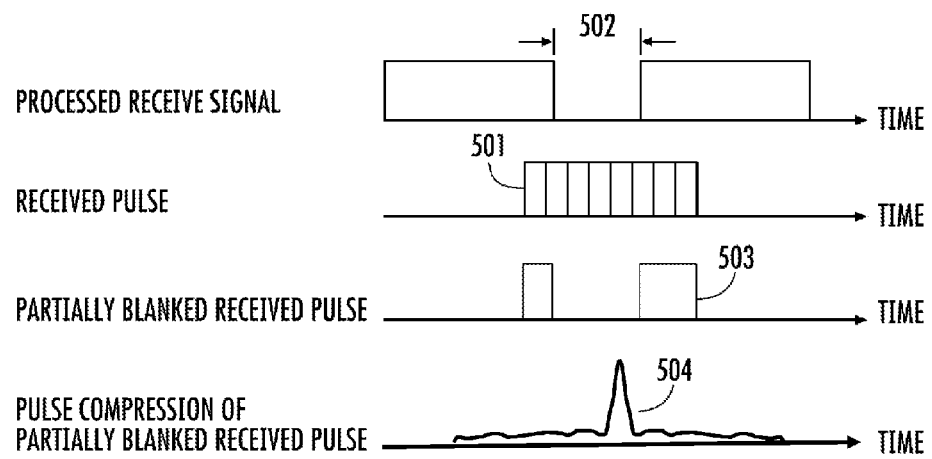
FIG. 5 illustrates the effect of pulse compression on blanked intervals.

FIG. 5 illustrates in more detail the effect of pulse compression on blanked ranges. Pulse compression is computed with all corresponding transmit bins replaced with "zeroes" as shown in the top trace 502 of FIG. 5. In this example receive pulse 501 as explained above consists of, say, seven bins. However, a portion of this received pulse is, blanked, at an interval corresponding to where the radar is transmitting a subsequent pulse. The partially blanked receive pulse thus appears as 503. However, even with a partially blanked received pulse, the pulse compression result still contains a peak 504. In other words, even the partially blanked received pulse thus still provides sufficient compression gain to cause a correlation peak 504, although the peak amplitude is lower than if the pulse were completely received. The compressed partial pulse thus can still contribute to increasing the signal to noise ratio, as it will be integrated over multiple pulses.

When the received pulse width is less than a receive blanked duration and all of the pulse return falls within the blanked duration (not shown in FIG. 5), the received pulse for some ranges will not be processed at all. However this is by design because other pulse returns from those range gates will be processed when the receivers are not completely blocked, that is, when the pulse return is not blocked or only partially blocked. The result is to still maintain a uniform fraction of pulse return energy over time. This processing technique, along with the uniform probability of pulses being received, eliminates the blind ranges, and provides constant pulse compression SNR gain across all range gates, except for the range gates that are near the radar.

Figure 6:
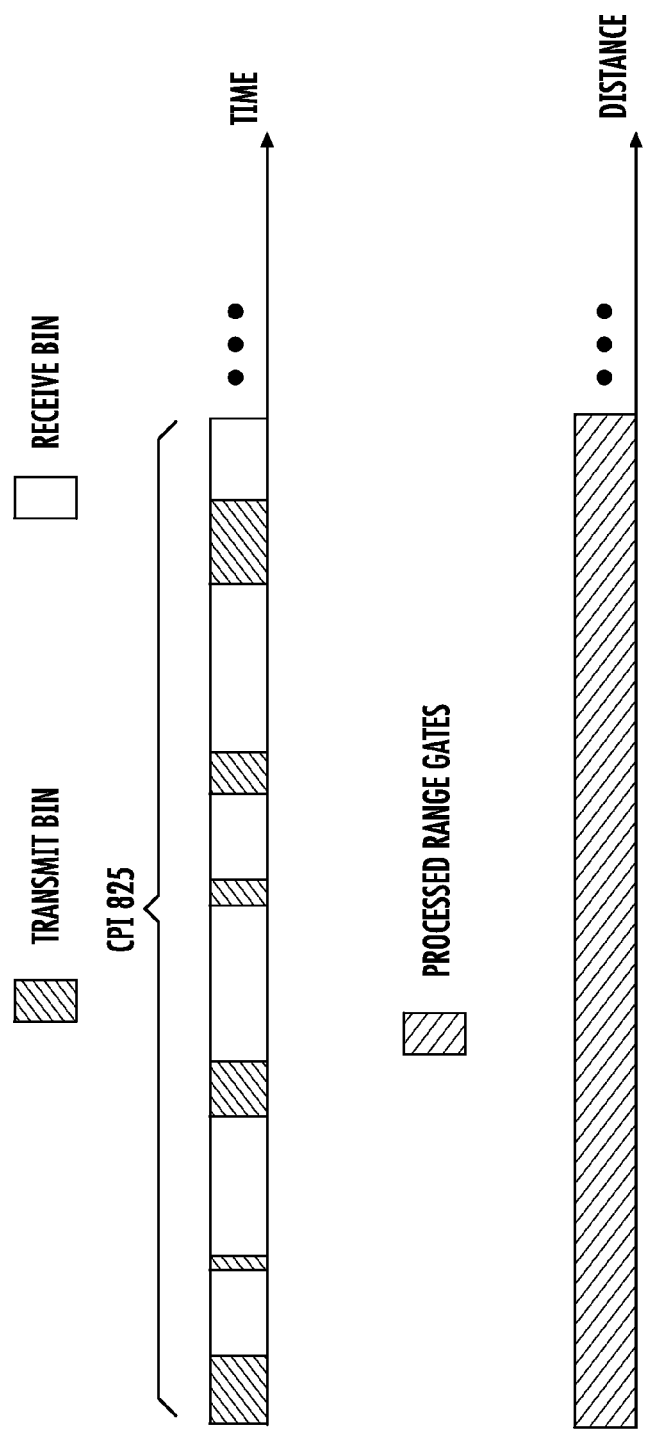
FIG. 6 is another implementation making use of the same techniques but where the pulse width and, the PRI are of arbitrary duration where constant duty cycle D is still achieved in any substantial portion of consecutive pulses within a CPI.

FIG. 6 shows a more generalized implementation of the time line without using discrete range bins. The pulse width and PRI are arbitrary, that is, they are not digitized into bins. Constant duty cycle is still achieved in a substantial portion of consecutive pulses within a CPI 825. It may be possible to vary only pulse width or PRI to achieve the desired randomization of duty cycle, but achieving such sequences with other desired properties may be more difficult. Again, different wave forms with minimal cross correlation are preferably used in the transmit pulses with a given CPI.

Even without discrete bins, random PRI and pulse width Doppler processing is still possible as long as one can properly keep track of the Doppler frequency, coding, and modulation changes as well as range migration when integrating multiple pulse compressions for each velocity in the Doppler filter bank 400. Performance should be comparable with the discrete bin version of FIG. 3, however, the discrete bin time and size may make implementations easier.

Requiring a unique waveform for each pulse, pulse compressing the pulses separately and handling the compressed pulses separately in the Doppler filter bank results in system complication. However, as signal processing technology becomes more powerful, such a requirement should become less a of concern.

With respect to Doppler processing, it should be understood that transmit waveform can be any waveform as long as it can be "beat" against itself with a 0 Doppler return.

While this invention has been particularly shown and described with references to example embodiments thereof, it will be understood by those skilled in the art that various changes in form and details may be made therein without departing from the scope of the invention encompassed by the appended claims.

What is claimed is:

1. A method of determining range information for a target comprising:
   generating a pulse signal comprising a train of transmit pulses, the transmit pulses having a pulse width, pulse waveform, and pulse repetition interval (PRI), at least two of which are each different for at least two consecutive pulses within the train of transmit pulses for a given Coherent Processing Interval (CPI), with the CPI defined by a set of transmit pulses in the train having a deterministic phase relationship of a reference frequency used to generate consecutive pulses;
   transmitting the pulse signal;
   receiving a return signal reflected from the target in response to transmitting;

range processing the return signal in a radar signal processor, to determine range information for the target; and wherein the CPI is further divided into transmit pulse periods and receive pulse periods, with the transmit and receive pulse periods of arbitrary length within a CPI, but also such that a total transmit duty cycle, D, is uniform from CPI to CPI.

2. The method of claim 1 wherein range processing further comprises:

Doppler processing the return signal at two or more Doppler offsets.

3. The method of claim 1 wherein the pulse width, pulse waveform, and pulse repetition interval are selected to provide equal energy in the return signal for different target ranges.

4. The method of claim 3 wherein the CPI is divided into a plurality of time bins of a selected bin duration, and the transmit and receive pulse periods are integer multiples of the selected bin duration.

5. The method of claim 1 wherein the arbitrary length is deterministic.

6. The method of claim 1 wherein the arbitrary length is pseudorandom.

7. The method of claim 1 wherein the arbitrary length is determined by an arithmetic algorithm.

8. The method of claim 1 wherein the pulse width and PRI are of arbitrary length, but with a constant duty cycle D achieved over a substantial set of consecutive transmit pulses within a CPI.

9. The method of claim 1 further comprising:

radio frequency modulating the pulse signal prior to transmitting such that at least two successive pulses within the pulse train have different modulation; and radio frequency demoduling the return signal prior to range processing.

10. The method of claim 1 wherein transmit pulse width, pulse waveform, and pulse repetition interval (PRI) are each different for at least two consecutive pulses within a given Coherent Processing Interval (CPI).

11. The method of claim 1 wherein the different waveform comprises a random waveform, different coding, or different modulation for the at least two consecutive pulses.

12. An apparatus comprising:

a pulse train signal generator, for generating a pulse signal comprising a train of transmit pulses, the transmit pulses having at least two of a pulse width, pulse waveform, and pulse repetition interval (PRI) that are each different for at least two consecutive pulses within the train of transmit pulses for a given Coherent Processing Interval (CPI), with the CPI defined by a set of transmit pulses in the train having a deterministic phase relationship of a reference frequency used to generate consecutive pulses;

a transmitter for transmitting the pulse signal;

a receiver for receiving a return signal;

a range processor, for processing the return signal to determine range information for the target; and wherein the CPI is divided into a plurality of time bins of a selected bin duration, and the transmit and receive pulse periods are integer multiples of the selected bin duration.

13. The apparatus of claim 12 wherein the range processor further comprises:

a Doppler processor comprising two or more Doppler offset sections.

14. The apparatus of claim 12 wherein the pulse width, pulse waveform, and pulse repetition interval are selected provide equal energy in the return signal for different target ranges.

15. An apparatus comprising:

a pulse train signal generator, for generating a pulse signal comprising a train of transmit pulses, the transmit pulses having at least two of a pulse width, pulse waveform, and pulse repetition interval (PRI) that are each different for at least two consecutive pulses within the train of transmit pulses for a given Coherent Processing Interval (CPI), with the CPI defined by a set of transmit pulses in the train having a deterministic phase relationship of a reference frequency used to generate consecutive pulses;

a transmitter for transmitting the pulse signal;

a receiver for receiving a return signal;

a range processor, for processing the return signal to determine range information for the target; and wherein the CPI is further divided into transmit pulse periods and receive pulse periods, with the transmit and receive pulse periods of arbitrary length within a CPI, but also such that a total transmit duty cycle, D, is uniform from CPI to CPI.

16. The apparatus of claim 15 wherein the arbitrary length is deterministic.

17. The apparatus of claim 15 wherein the arbitrary length is pseudorandom.

18. The apparatus of claim 15 wherein the arbitrary length is determined by an arithmetic algorithm.

19. An apparatus comprising:

a pulse train signal generator, for generating a pulse signal comprising a train of transmit pulses, the transmit pulses having at least two of a pulse width, pulse waveform, and pulse repetition interval (PRI) that are each different for at least two consecutive pulses within the train of transmit pulses for a given Coherent Processing Interval (CPI), with the CPI defined by a set of transmit pulses in the train having a deterministic phase relationship of a reference frequency used to generate consecutive pulses;

a transmitter for transmitting the pulse signal;

a receiver for receiving a return signal;

a range processor, for processing the return signal to determine range information for the target; and wherein the pulse width and PRI are of arbitrary length, but with a constant duty cycle D achieved over a substantial set of consecutive transmit pulses within a CPI.

20. The apparatus of claim 14 further comprising:

a radio frequency modulator, for modulating the pulse signal such that at least two successive pulses within the transmitted pulse train have different modulation; and a radio frequency demodulator, for demodulating the return signal.

21. An apparatus comprising:

a pulse train signal generator, for generating a pulse signal comprising a train of transmit pulses, the transmit pulses having at least two of a pulse width, pulse waveform, and pulse repetition interval (PRI) that are each different for at least two consecutive pulses within the train of transmit pulses for a given Coherent Processing Interval (CPI), with the CPI defined by a set of transmit pulses in the train having a deterministic phase relationship of a reference frequency used to generate consecutive pulses;

a transmitter for transmitting the pulse signal;

a receiver for receiving a return signal;

a range processor, for processing the return signal to determine range information for the target; and wherein transmit pulse width, pulse waveform, and PRI are each different for at least two consecutive pulses within a given CPI.

22. The apparatus of claim 21 wherein the different pulse waveform comprises a signal with random properties, different coding, and/or different modulation for the at least two consecutive pulses within a CPI.

23. The apparatus of claim 21 wherein the reference frequency used to generate a selected pulse in the pulse train is identical to a reference frequency used to generate a consecutive pulse.

\* \* \* \* \*

UNITED STATES PATENT AND TRADEMARK OFFICE
CERTIFICATE OF CORRECTION

PATENT NO.        : 9,075,138 B2                                    Page 1 of 1
APPLICATION NO.   : 13/453195
DATED             : July 7, 2015
INVENTOR(S)       : William S. Song It is certified that error appears in the above-identified patent and that said Letters Patent is hereby corrected as shown below:

In the Claims:
Claim 4, Col. 7, line 16 should read:
4. The method of claim 1 wherein the CPI is divided into a Signed and Sealed this
First Day of December, 2015

Michelle K. Lee
*Director of the United States Patent and Trademark Office*